(12) United States Patent
Bhageria et al.

(10) Patent No.: US 10,372,479 B2
(45) Date of Patent: Aug. 6, 2019

(54) SCHEDULING FRAMEWORK FOR TIGHTLY COUPLED JOBS

(71) Applicant: INTERNATIONAL BUSINESS MACHINES CORPORATION, Armonk, NY (US)

(72) Inventors: Gopal K. Bhageria, Kolkata (IN); Rajesh K. Saxena, Maharashtra (IN); Vikram Yadav, Farrukhabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 15/672,355

(22) Filed: Aug. 9, 2017

(65) Prior Publication Data
US 2019/0050245 A1    Feb. 14, 2019

(51) Int. Cl.
G06F 9/48     (2006.01)
G06F 9/50     (2006.01)
G06F 9/455    (2018.01)

(52) U.S. Cl.
CPC ...... *G06F 9/45558* (2013.01); *G06F 9/45504* (2013.01); *G06F 9/4887* (2013.01);
(Continued)

(58) Field of Classification Search
CPC .................................................. G06F 9/45558
See application file for complete search history.

(56) References Cited

U.S. PATENT DOCUMENTS 5,142,684 A  * 8/1992 Perry ..................... G06F 1/08
                                                    713/320
2013/0312006 A1* 11/2013 Hardman ............ H04L 67/1008
                                                    718/105
(Continued)

OTHER PUBLICATIONS

Karthikeyan, P., et al., "K-Tier Computation of Parallel Workload in Cloud", Proceedings of International Conference on Global Innovations in Computing Technology (ICGICT'14), Mar. 2014, vol. 2, Special Issue 1, International Journal of Innovative Research in Computer and Communication Engineering, pp. 3462-3466.
(Continued)

*Primary Examiner* — Sisley N Kim
(74) *Attorney, Agent, or Firm* — Michael O'Keefe; Matthew M. Hulihan; Heslin Rothenberg Farley & Mesiti PC

(57) ABSTRACT

Managing execution of a job in a computing environment. A method establishes, for a job to be executed in the computing environment, an execution plan for processing the job. The execution plan identifies computationally intensive tasks of the job and data intensive tasks of the job. The method selects a virtual machine of the computing environment to process the identified computationally intensive tasks of the job and identified data intensive tasks of the job. The method assigns the identified computationally intensive tasks of the job for foreground processing of the virtual machine and assigns the identified data intensive tasks of the job for background processing of the virtual machine. Execution of the job executes the identified computationally intensive tasks of the job in foreground processing of the virtual machine and executes the identified data intensive tasks of the job in background processing of the virtual machine.

17 Claims, 9 Drawing Sheets

(52) U.S. Cl.
CPC .... *G06F 9/5038* (2013.01); *G06F 2009/4557* (2013.01); *G06F 2209/508* (2013.01)

(56) References Cited

U.S. PATENT DOCUMENTS

2016/0085572 A1   3/2016   Hotra
2016/0085587 A1*  3/2016   Dube ................... G06F 9/5011
                                                              718/104

OTHER PUBLICATIONS

Nirmal, S.S., et al., "Integration of Parallel Workloads in Cloud Environment Based on Priority", International Journal of Engineering Technology, Management and Applied Sciences, Feb. 2016, vol. 4, Issue 2, www.ijetmas.com, pp. 47-49.

Ghoghra, Dharmishtha J., et al., "Dynamic Splitting of Deadline Constraint Jobs for Parallel Processing in Cloud Environment", Journal of Information, Knowledge and Research in Information Technology, Nov. 12 to Oct. 13, vol. 2, Issue 02, http://www.ejournal.aessangli.in/ASEEJournals/IT26.pdf, pp. 136-141.

Mell, Peter, et al., "The NIST Definition of Cloud Computing", NIST Special Publication 800-145, Sep. 2011, Gaithersburg, MD, 7 pgs.

"Identifying Memory and CPU Intensive Code", retrieved Jul. 6, 2017. Retrieved from the Internet URL: https://coderwall.com/p/-qtvcq/identifying-memory-and-cpu-intensive-code, last updated: Feb. 29, 2016, 5 pgs.

"Plan Item Execute Request Event", retrieved Jul. 6, 2017. Retrieved from the Internet URL: https://docs.tibco.com/pub/af/3.0.2/doc/html/GUID-00F5275E-3C97-492A-B83D-D4F3971384932.html, TIBCO® Fulfillment Order Management, 4 pgs.

"TIBCO® Fulfillment Order Management Concepts and Architecture", Software Release 2.1.0, Sep. 2013. Retrieved from the Internet URL: https://docs.tibco.com/pub/activefulfillment/2.1.0_september_2013/doc/pdf/tib_af_concepts_guide.pdf, TIBCO®, 68 pgs.

T., Arithi, et al., "Energy Aware Cloud Service Provisioning Approach for Green Computing Environment", 2013, IEEE, pp. 139-144.

Luo, Zhaoyi, et al., "Burstiness-aware Server Consolidation via Queuing Theory Approach in a Computing Cloud", 27th International Symposium on Parallel & Distributed Processing, 2013, IEEE, pp. 332-341.

Cao, Zhibo, et al., "CaoDynamic VM consolidation for energy-aware and SLA violation reduction in cloud computing", 13th International Conference on Parallel and Distributed Computing, Applications and Technologies, 2012, IEEE, pp. 363-369.

Gaggero, Mauro, et al., "A Predictive Control Approach for Energy-Aware Consolidation of Virtual Machines in Cloud Computing," 53rd IEEE Conference on Decision and Control, Dec. 15-17, 2014, Los Angeles, CA, pp. 5308-5313.

Bharathi, A., et al., "Profit and Energy Aware Scheduling in Cloud Computing using Task Consolidation", ICICES2014—S.A. Engineering College, Chennai, Tamil Nadu, India, 2014, IEEE, 6 pgs.

Farahnakian, Fahimeh, et al., "Utilization Prediction Aware Vm Consolidation Approach for Green Cloud Computing", 8th International Conference on Cloud Computing, 2015, IEEE, pp. 381-388.

* cited by examiner

SCHEDULING FRAMEWORK FOR TIGHTLY COUPLED JOBS

BACKGROUND

There have been significant advancements related to multi-tier (e.g. 2-tier, k-tier) virtual machine architectures in computing environments, and particularly multi-tasking, multi-processing, and multi-threading of job assignments therein.

To complete a job having tasks, process(es) are instantiated in a run-time environment. It is possible to ascertain the 'coupling' as between tasks of a single job, or even as between different jobs. The 'coupling' of items in computer technology is generally understood and falls into two primary categories—'loosely-coupled' or 'tightly-coupled', referring generally to the degree of interdependency between the individual items. With regard to job processing, interdependency of tasks of job can be a function of the extent to which data is needed by one entity from another entity. The more interdependency that exists, the tighter the coupling. The looser the coupling, the higher the scalability of jobs. Even dependencies may be processed by different entities when the job is processed from a common heap space.

There are three primary types of computing models: parallel, grid, and distributed computing. Cloud computing is a condensed form of distributed and grid computing. Data centers are an element of an infrastructure-as-a-service (IaaS) cloud computing environment.

Improving resource utilization can be important for achieving cost effectiveness. In legacy data centers, low utilization has long been an issue. Servers in a typical data center may be operated at 10-50% of their maximum utilization level, for instance. For a data center, or a subset of servers in a data center that mainly handles applications with high-performance computing needs and runs parallel jobs, frequently this this low utilization can be a significant problem.

For running parallel jobs in a distributed cloud environment, one challenge is that, as in cases of parallel job requirements, selecting and managing a number of nodes to run. A set of nodes may be fragmented by parallel jobs with different node number requirements. If the number of available nodes cannot satisfy the requirement of an incoming job, nodes may remain idle and their utilization low until enough nodes are available to process the incoming job. For instance, a basic, but often used, batch scheduling algorithm for parallel jobs is first-come, first served (FCFS). This specifies a number of nodes required and the scheduler processes jobs according to the order of their arrival. When there is a sufficient number of nodes to process the job at the head of the queue, the scheduler dispatches the job to run on these nodes; otherwise, it waits until jobs currently running finish and release enough nodes for the next job to process. This causes some of the undesirable low utilization.

SUMMARY

Shortcomings of the prior art are overcome and additional advantages are provided through the provision of a computer-implemented method. The method establishes, for a job of a plurality of jobs to be executed in a computing environment, an execution plan for processing the job, the execution plan identifying computationally intensive tasks of the job and data intensive tasks of the job. The method selects a virtual machine, of a plurality of virtual machines of the computing environment, to process the identified computationally intensive tasks of the job and identified data intensive tasks of the job. The method assigns the identified computationally intensive tasks of the job for foreground processing of the virtual machine and assigns the identified data intensive tasks of the job for background processing of the virtual machine, where execution of the job executes the identified computationally intensive tasks of the job in foreground processing of the virtual machine and executes the identified data intensive tasks of the job in background processing of the virtual machine.

Further, a computer program product including a computer readable storage medium readable by a processor and storing instructions for execution by the processor is provided for performing a method. The method establishes, for a job of a plurality of jobs to be executed in a computing environment, an execution plan for processing the job, the execution plan identifying computationally intensive tasks of the job and data intensive tasks of the job. The method selects a virtual machine, of a plurality of virtual machines of the computing environment, to process the identified computationally intensive tasks of the job and identified data intensive tasks of the job. The method assigns the identified computationally intensive tasks of the job for foreground processing of the virtual machine and assigns the identified data intensive tasks of the job for background processing of the virtual machine, where execution of the job executes the identified computationally intensive tasks of the job in foreground processing of the virtual machine and executes the identified data intensive tasks of the job in background processing of the virtual machine.

Yet further, a computer system is provided that includes a memory and a processor in communication with the memory, wherein the computer system is configured to perform a method. The method establishes, for a job of a plurality of jobs to be executed in a computing environment, an execution plan for processing the job, the execution plan identifying computationally intensive tasks of the job and data intensive tasks of the job. The method selects a virtual machine, of a plurality of virtual machines of the computing environment, to process the identified computationally intensive tasks of the job and identified data intensive tasks of the job. The method assigns the identified computationally intensive tasks of the job for foreground processing of the virtual machine and assigns the identified data intensive tasks of the job for background processing of the virtual machine, where execution of the job executes the identified computationally intensive tasks of the job in foreground processing of the virtual machine and executes the identified data intensive tasks of the job in background processing of the virtual machine.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are aspects related to job assignment for processing tightly-coupled jobs having tasks that may be categorized into two categories: computationally intensive tasks and data intensive tasks. The tight coupling refers to the dependency between one or more computationally intensive task(s) and one or more data intensive task(s). A proposed framework may be particularly useful in the assignment of relatively complex jobs that require a relatively large amount of time to be processed.

Figure 1:
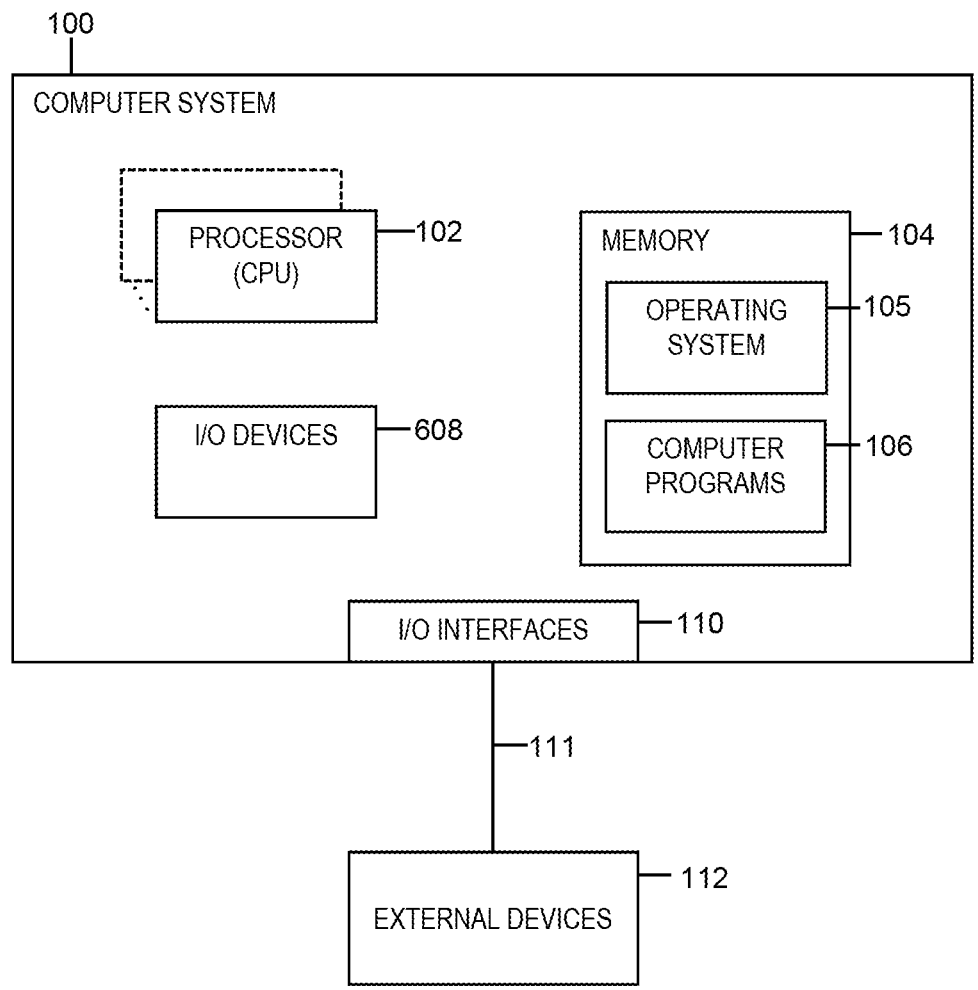
FIG. 1 depicts one example of a computer system and associated devices to incorporate and/or use aspects described herein.

Initially, processes described herein may be performed singly or collectively by one or more computer systems, such as one or more cloud computing systems, virtual machines, nodes, or the like, as examples. FIG. 1 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA) or Intel Corporation (Santa Clara, Calif., USA), as examples.

FIG. 1 shows a computer system 100 in communication with external device(s) 112. Computer system 100 includes one or more processor(s) 102, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 102 can also include register(s) to be used by one or more of the functional components. Computer system 100 also includes memory 104, input/output (I/O) devices 108, and I/O interfaces 110, which may be coupled to processor(s) 102 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 104 can be or include main or system memory (e.g. Random Access Memory) used in the execution of program instructions, storage device(s) such as hard drive(s), flash media, or optical media as examples, and/or cache memory, as examples. Memory 104 can include, for instance, a cache, such as a shared cache, which may be coupled to local caches (examples include L1 cache, L2 cache, etc.) of processor(s) 102. Additionally, memory 104 may be or include at least one computer program product having a set (e.g., at least one) of program modules, instructions, code or the like that is/are configured to carry out functions of embodiments described herein when executed by one or more processors.

Memory 104 can store an operating system 105 and other computer programs 106, such as one or more computer programs/applications that execute to perform aspects described herein. Specifically, programs/applications can include computer readable program instructions that may be configured to carry out functions of embodiments of aspects described herein.

Examples of I/O devices 108 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (112) coupled to the computer system through one or more I/O interfaces 110.

Computer system 100 may communicate with one or more external devices 112 via one or more I/O interfaces 110. Example external devices include a keyboard, a pointing device, a display, and/or any other devices that enable a user to interact with computer system 100. Other example external devices include any device that enables computer system 100 to communicate with one or more other computing systems or peripheral devices such as a printer. A network interface/adapter is an example I/O interface that enables computer system 100 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 110 and external devices 112 can occur across wired and/or wireless communications link(s) 111, such as Ethernet-based wired or wireless connections. Example wireless connections include cellular, Wi-Fi, Bluetooth®, proximity-based, near-field, or other types of wireless connections. More generally, communications link(s) 111 may be any appropriate wireless and/or wired communication link(s) for communicating data.

Particular external device(s) 112 may include one or more data storage devices, which may store one or more programs, one or more computer readable program instructions, and/or data, etc. Computer system 100 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 100 may be operational with numerous other general purpose or special purpose computing system environments or configurations. Computer system 100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s)/components thereof that include any of the above systems or devices, and the like.

Figure 2:
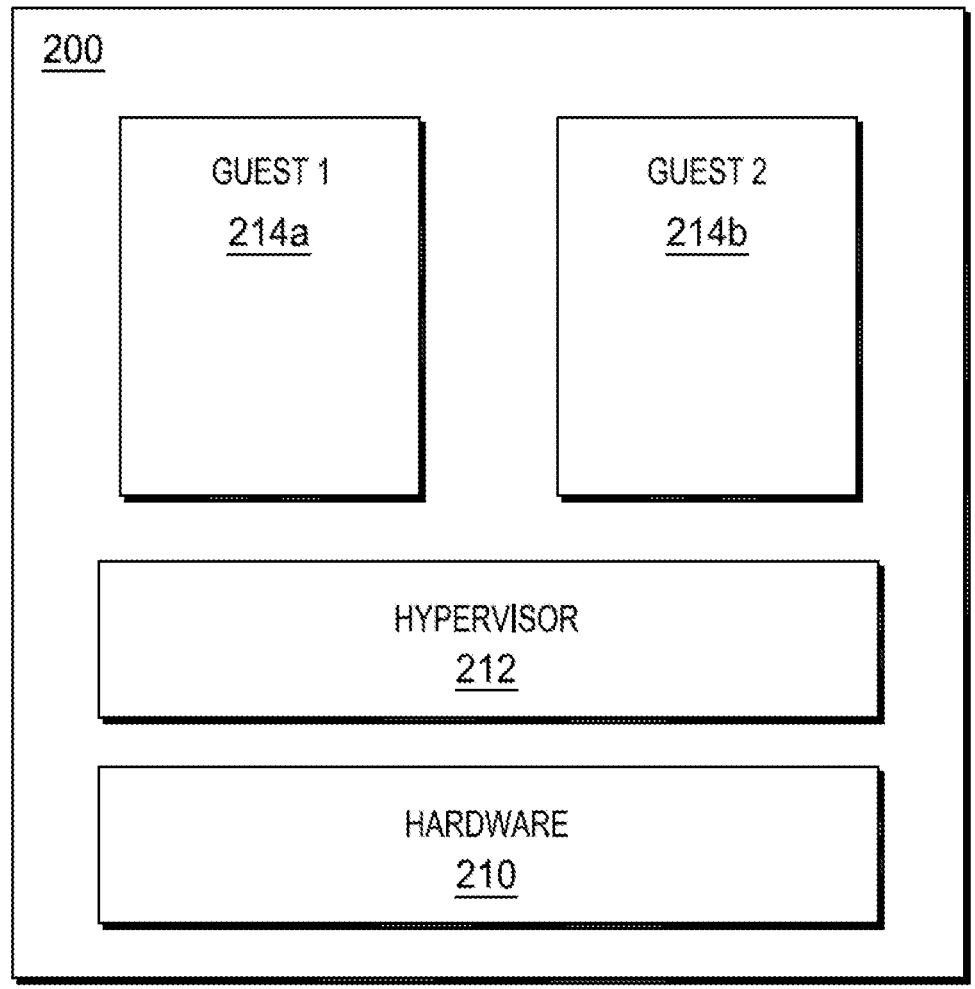
FIG. 2 depicts a further example of a computer system to incorporate and use aspects described herein.

Cloud computer systems may host virtual machines to perform processing, for instance processing of computer jobs. Though various different example environments for hosting virtual machines exist, FIG. 2 depicts a further example of a computer system to incorporate and use aspects described herein, particularly a computer system that leverages a hypervisor to manage virtual machines that the computer system hosts. In FIG. 2, computer system 200 is shown having hardware 210 that includes the hardware resources of the system, such as processor(s), main memory, I/O devices, etc. A hypervisor 212 sits (conceptually) above hardware 210 in that the hypervisor 212 may virtualize the underlying hardware resources to provide virtualized environment(s) for guests. In some embodiments, hypervisor 212 uses hardware-assisted virtualization available through extensions supported by the processor(s). These extensions are termed "processor extensions" or "VM extensions". In this example, hypervisor 212 'hosts' two guest systems 214a and 214b, which may be virtual machines executing one or more operating systems and other computer programs, and performing job processing.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. Examples nodes may be computer systems (such as those depicted in FIGS. 1 and 2). One such node is node 10 depicted in FIG. 3 in a cloud computing environment.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

Figure 3:
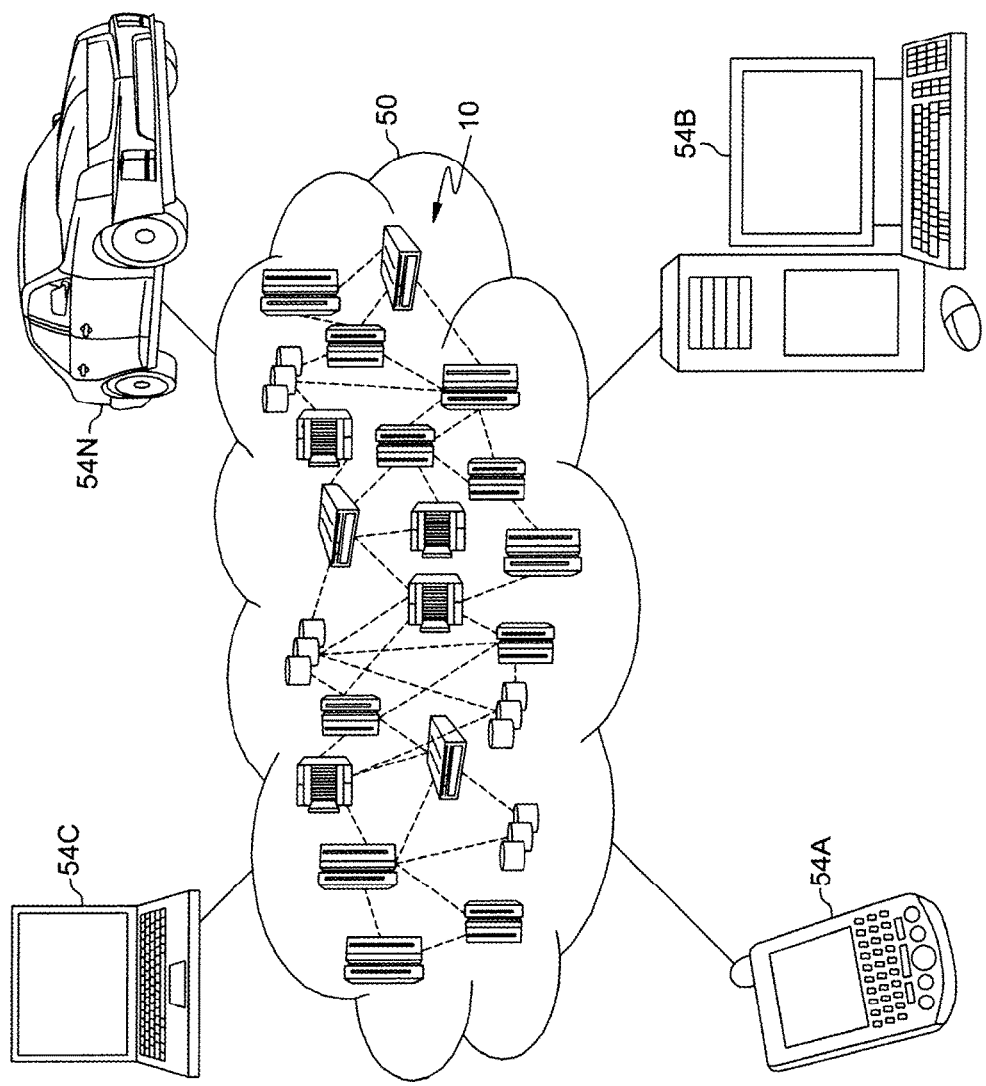
FIG. 3 depicts a cloud computing environment according aspects described herein.

Referring now to FIG. 3, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
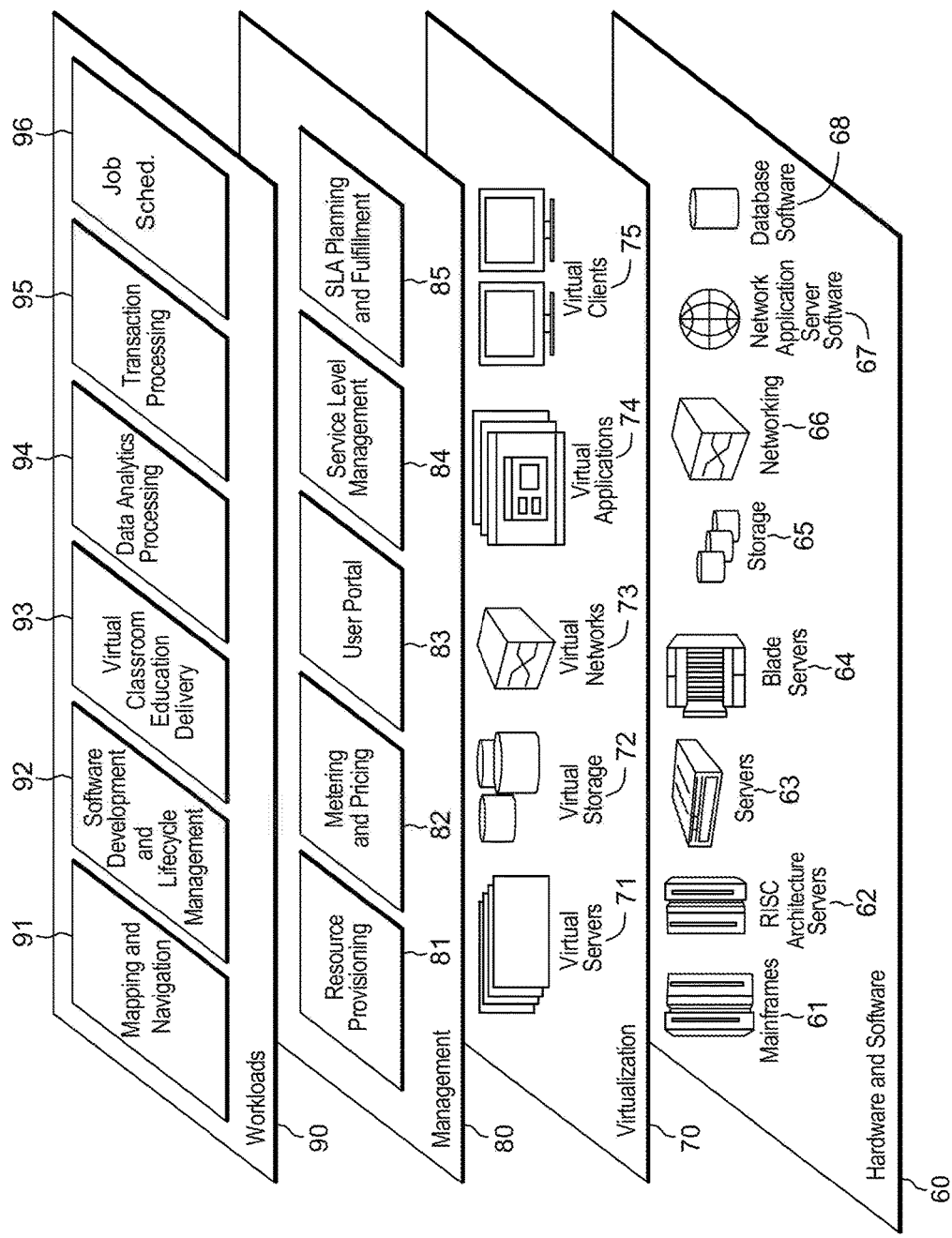
FIG. 4 depicts abstraction model layers according to aspects described herein.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and job scheduling 96.

Advancements related to job processing provide an ability to break a job into different batches of operation. Presented herein is a scheduling framework that gives a systematic way to consolidate parallel jobs between foreground and background processing of a virtual machine in a cloud environment, enabling reduction or minimization of node idle time. In examples described herein, job resource requirements are expressed with respect to a number of 'nodes', with nodes referring to virtual machines in the examples herein. However, it should be appreciated that a 'node' could refer to a physical computer system, such as a host, rather than virtual machines themselves.

Herein it is proposed to apply parallel processing and divide tasks of a job for assignment to two layers of virtual machine (VM) processing—foreground processing and background processing. In particular, computationally intensive tasks of the job are assigned for foreground processing of the VM and data intensive tasks of the job are assigned for background processing of the VM.

Response time (for a time-sharing environment) is understood as the amount of time it takes from a request submission until the first response is produced (rather than output). Aspects leverage the proposed framework to run jobs in scalable and non-scalable modes of operations. This is achieved by breaking the job into two layers of VM processing—foreground and background—that can minimize the idle time, minimize energy consumption, etc. The cloud computing paradigm can provide a cost-effective solution for running business applications through the use of virtualization technologies, highly scalable distributed computing, and data management techniques, as well as a 'pay-as-you-go' pricing model. Since cloud computing is typically a "pay-per" model, it can be an important objective to efficiently utilize the computational resources. Cloud computing, as noted above, also offers high-performance computing capacity for applications to solve complex problems, for instance to process jobs.

Accordingly, aspects described herein can provide reliable and fast response time system for parallel processing of jobs. Aspects can also provide an implementation reference architecture that embodies the various parts of the scheduling framework thus making it a self-coordinating system.

In some embodiments, the following base assumptions may apply:

Instances (perhaps all) of the subject VMs can be configured to be executing foreground and background processes mutually exclusive to each other for a virtualization deployment 'Tightly-coupled' jobs can be broken down into an execution plan with clear dependencies being identified between individual execution 'blocks' or tasks, being stratified into two distinct tiers—computationally intensive tasks and data intensive tasks. In this regard, existing technology can perform such execution plan generation and stratification of a job into the computational intensive tasks vs. data intensive tasks. By way of basic example, an addition operation over the data (2+3) is a 'computationally intensive' task. Obtaining/ accessing the operand data (2, 3) is a dependency 'data intensive' task. Appending a string to another string is another example of a 'computationally intensive' task with a dependency being the data intensive task of retrieving both strings, e.g. from memory.

Dependencies (data intensive tasks) may, perhaps by rule, be executed in the background processing of the VM while the primary (computationally intensive) blocks/tasks may be placed in the foreground processing of the VM.

Job tasks are not to be executed in the background processing of a VM instance if the foreground is not fully (appropriately) utilized. That is, for the jobs being scheduled according to aspects described herein, there are necessarily computationally intensive tasks being scheduled for foreground processing if there are data intensive task(s) being scheduled for background processing. This is not to preclude the possibility that some jobs—for instance ones with only, or predominantly, data intensive tasks—are contemporaneously being scheduled according to a different approach (for instance to run all of such data intensive tasks in the foreground).

FIGS. 5A-5D depict an example process for scheduling jobs, in accordance with aspects described herein. In some examples, the process is performed by a job scheduler of a cloud environment, for instance a scheduler implemented as program instructions executing on a computer system.

Figure 5A:
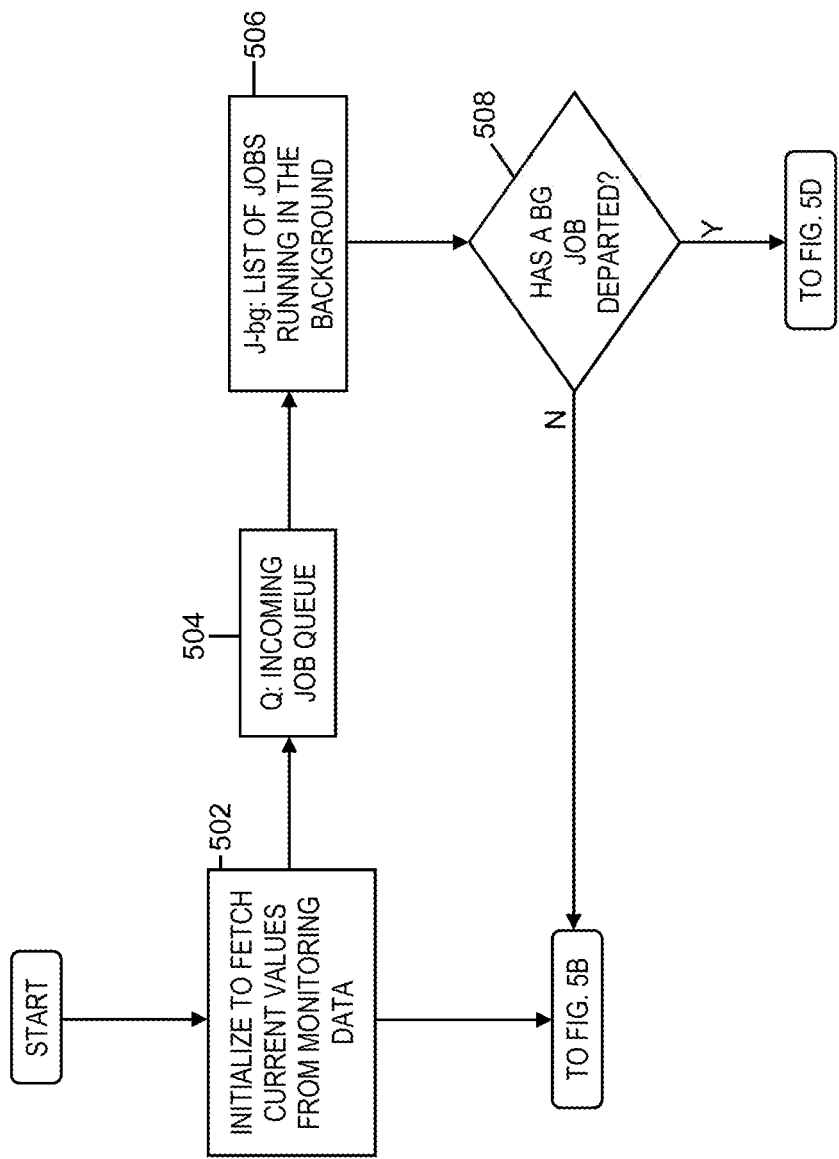
FIGS. 5A-5D depict an example process for scheduling jobs, in accordance with aspects described herein.

Referring to FIG. 5A, initially the process begins with initialization to fetch current values from monitoring data (502). Node utilization represents the ratio of assigned job processing time versus total time. Deducting idle time from the total time provides assigned job processing time. The example processes of FIG. 5A-5D reduces the idle time and assigns the job in such a manner that utilization of the VM increases. Incoming jobs are placed in a queue Q, defined as the incoming job queue (504). J-bg is the list of jobs that are running in the background (506). A determination (508) is made whether a background job has departed (which would occur before a job is completed). In the example process, all the background jobs are finished before completing the jobs. If a background job has departed, the process proceeds to FIG. 5D, otherwise the process the proceeds to FIG. 5B.

Figure 5B:
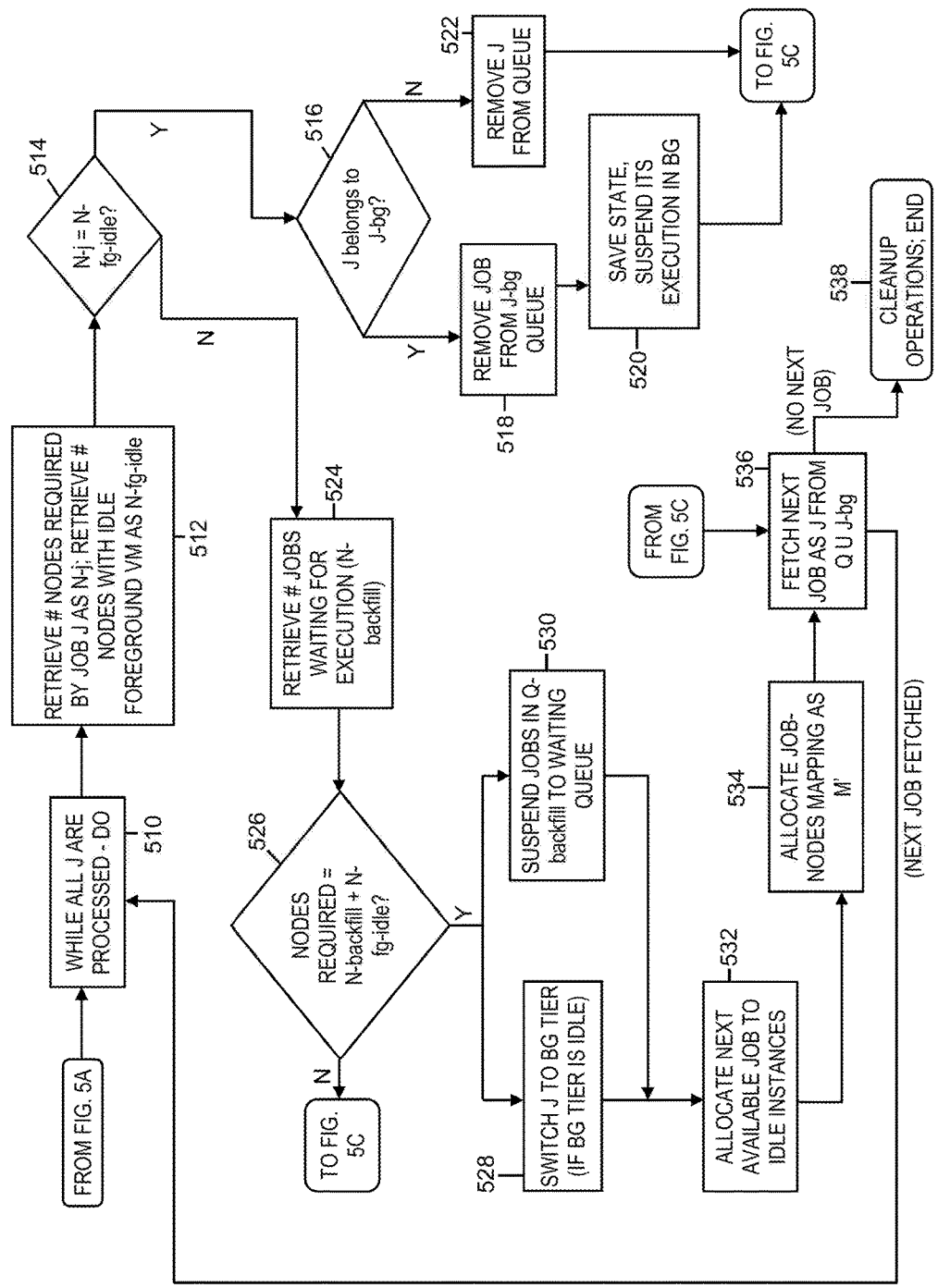

Referring to FIG. 5B, while all jobs are processed (510), the process of FIGS. 5A-5D performs the following. The process retrieves the number of nodes required by the next job J, denoted N-j, and checks the number of nodes in an idle state, i.e. with idle foreground virtual machine, denoted N-fg-idle (512). Before assigning a job from the queue to the VM(s), it can check whether the required number of VM(s) are available. Secondly, it can check the queue FIFO sequencing. The process proceeds by determining whether the number of virtual machines whose foreground is idle are equal to the number required for job J, i.e. whether N-j=N-fg-idle (514) (in some examples, it makes a conditional check over the required number of VMs in which it will iteratively increment its count of available idle VMs by one (assuming another idle VM is available) and check whether the equality condition is satisfied. If so, the required number of available idle VMs is available, otherwise it continues to increment until the equality condition is satisfied or there as no more idle VMs available. This approach may be taken for faster processing rather than counting all of the idle nodes before allocation). If the number of idle nodes and required nodes are equal (514, Y), the process determines whether job J is already assigned to any background virtual machine (516). If so (516, Y), the process removes the job from the background queue (518), saves the state and suspends its execution in background (520), and proceeds to FIG. 5C. Otherwise, if at 516 it is determined that job J is not already assigned to any background virtual machine (516, N), the process removes job J from the queue (522) and proceeds to FIG. 5C.

If instead at 514 it is determined that the number of idle nodes and required nodes are not equal (514, N), the process proceeds by retrieving the number of jobs waiting for execution, denoted N-backfill (524). The process determines whether the nodes required is equal to the sum of the number of jobs waiting for execution (N backfill shows the number of nodes that are available for processing of jobs) and the number of number of nodes in an idle state (526) (again, the conditional check over the required number of VMs may be made as before). If not (526, N), the process proceeds to FIG. 5C. Otherwise (526, Y), the process switches the job to the background tier if the background tier is idle (528) (if the background tier is not idle, the job cannot be assigned thereto) and suspends jobs in Q-backfill (the jobs that are in the job for the processing) to waiting queue (530). If the required number of nodes is not available in the N-queue, there is no advantage of putting that job into the waiting queue. The process then proceeds by allocating the next available job to idle instances (532), and allocating job-nodes mapping as M' (534). Job-nodes mapping is related to the job allocation to the required nodes. It will fetch the job from the queue and assign to the VM.

The process then fetches the next job J from Q U J-bg, i.e. Q union J-bg (536). Assuming there is a next job fetched, the process returns to 510, otherwise if there is no next job the process performs cleanup operations and ends (538).

Figure 5C:
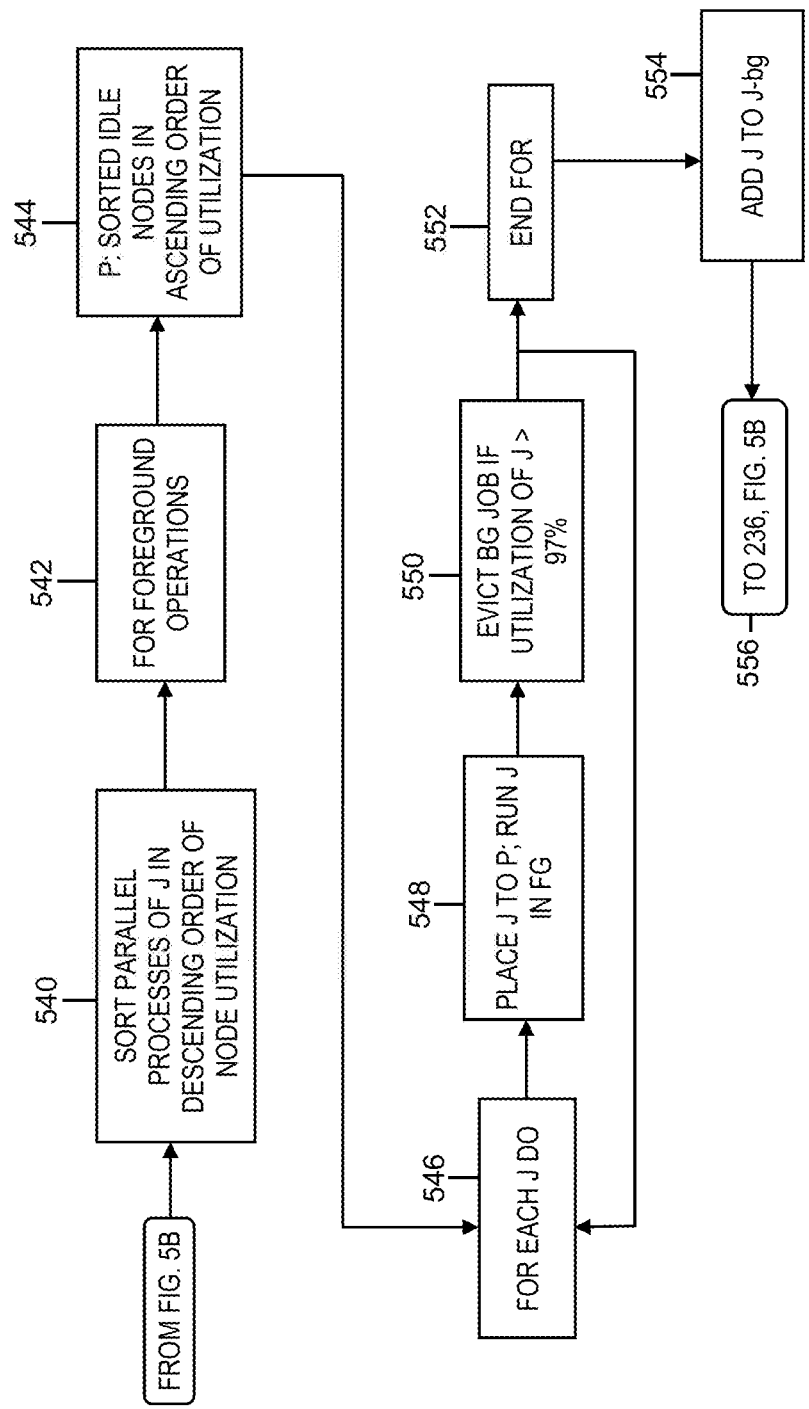

Referring now to FIG. 5C, the process sorts the parallel processes of job J in descending order of node utilization (540), then for foreground operations (542) and defining P as the sorted idle nodes in ascending order of their utilization (544), performs the following. For each job J (546), the process places J to P, running job J in the foreground (548), and evicts the background job if the utilization of the job J>97% (550). The job that is running in background will have greater utilization if the same job computational intensive task(s) is/are ongoing in the foreground because for the same job, they will be accessing memory from the heap. Thus, the process returns to 546 to repeat. Eventually this is performed for each job J, in which case the "For" loop ends (552) and the process adds job J to J-bg (554). The process then proceeds to 536 of FIG. 5B (556) to fetch a next job.

Figure 5D:
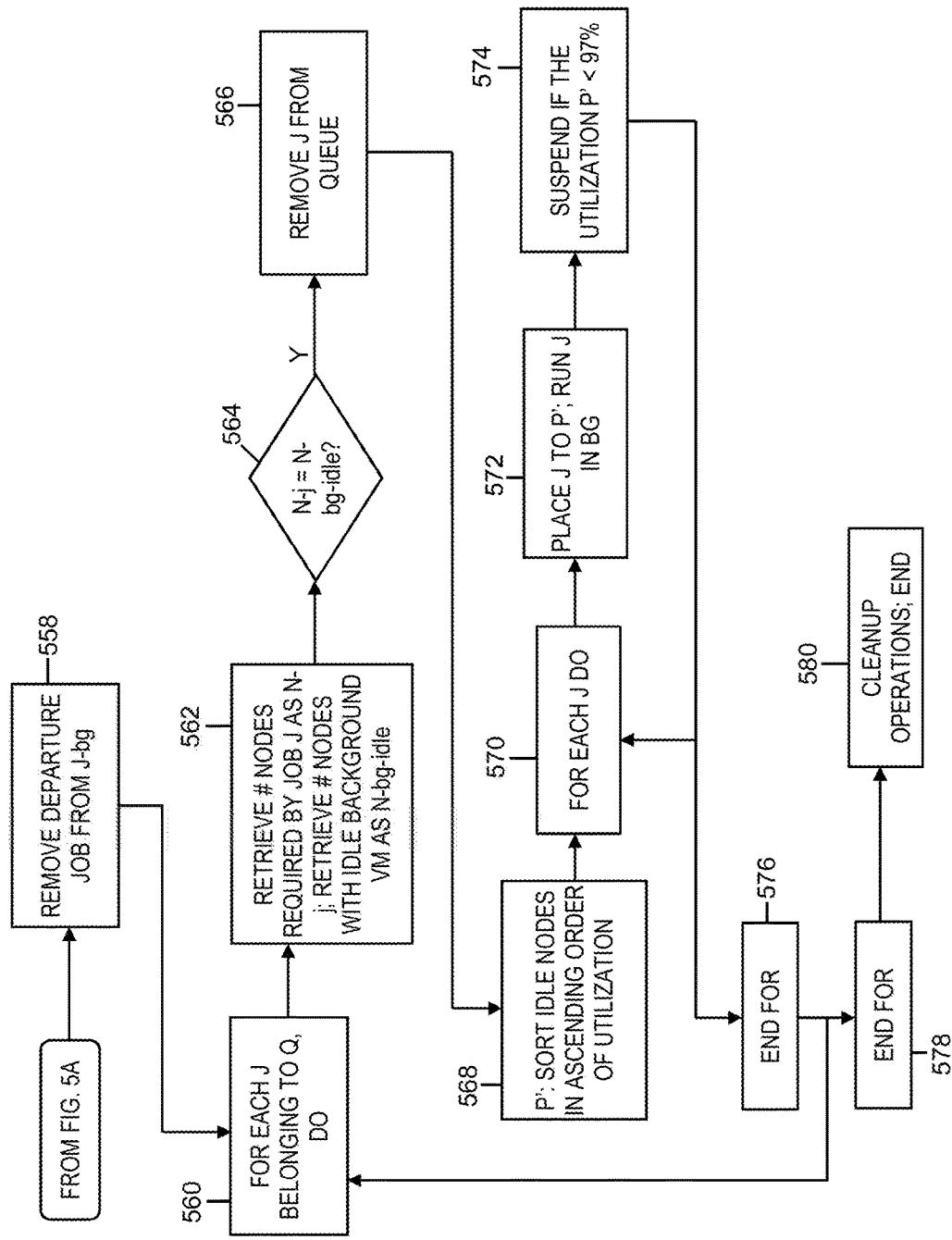

Referring now to FIG. 5D (from determining that a background job has departed, see FIG. 5A), the process removes the job from jobs running in the background (558), then, for each J belonging to the queue Q (558), the process performs the following. The process retrieves N-j, the number of nodes required by job J, N-j, and checks the number of nodes in an idle state, i.e. with idle background virtual machine, denoted N-bg-idle (562). The process proceeds by determining whether the number of virtual machines whose background is idle is equal to the number required for job J, i.e. whether N-j=N-bg-idle (564). If so (564, Y), the process removes job J from the queue (566) (otherwise, it will wait until the required number of nodes are available). Based on removing job J from the queue (566), and defining P' to be sorted idle nodes in ascending order of utilization for each job, the process performs for each job J (570), placing job J to P' and running this job in the background (572) and suspending the job if utilization P' is less than 97% (574). P' utilization shows the (total time-idle time) in percentage terms and the average shows over n nodes. Eventually this is performed for each job J, in which case that inner "For" loop ends (576), and the process either returns to 560 if there are more jobs J in Q, otherwise the outer "For" loop ends (578) and the process finally performs cleanup operations and ends (580).

The following presents an example description of modeling job handling in accordance with aspects described herein. A random process may not be able to be accurately modeled by a single exponential state. Consequently, it can be useful to combine a number of exponentials leading to the more general class of phase type distributions of which three special cases of phase type distributions are discussed, namely Erlang, Hypoexponential and Hyperexponential distributions.

An evaluation of the model is constructed by considering only exponentially distributed timed and immediate transitions. Applied phase approximation tries to reproduce the behavior of the unknown distribution function.

Measured data from the real system has an average µd and a standard deviation σd. This helps in adjusting stochastic behavior through the phase approximation technique. The inverse of the variation coefficient of the measured data is presented as $$\frac{1}{CV} = \frac{\mu d}{\sigma d} \qquad \text{(Eq. 1)}$$

This allows the selection of which distribution (Erlang, Hypoexponential and Hyperexponential distributions) matches best.

Given that the inverse of the variation coefficient can range to a whole number different from one, it would suggest trapezoidal transformation and thus the empirical data is characterized by an Erlang distribution. This distribution is represented in the adopted model by a sequence of exponential transitions whose length can be shown as $$\gamma = \left(\frac{\mu d}{\sigma d}\right)^2 \qquad \text{(Eq. 2)}$$

The firing rate of each exponential transition can then be calculated as $$\lambda = \left(\frac{\Upsilon}{\mu d}\right) \qquad \text{(Eq. 3)}$$

The adopted model now represents the distribution composed of a sequence whose length is calculated by $$\left(\frac{\mu d}{\sigma}\right)^2 - 1 \le \Upsilon < \left(\frac{\mu d}{\sigma}\right)^2 \qquad \text{(Eq. 4)}$$

The adopted model here is the hypoexponential distribution. The hypoexponential distribution is a generalization of the Erlang distribution (a Gamma distribution with an integer-valued shape parameter). It thus enables bringing the variation modulation in the adopted model as the hypoexponential distribution is two or more exponential distributions convolved together.

The firing rate of each exponential transition is given by $$\lambda_1 = \frac{1}{\mu_1} \qquad \text{(Eq. 5)}$$

$$\lambda_2 = \frac{1}{\mu_2} \qquad \text{(Eq. 6)}$$

where, the respective average delays (expected values) of time assigned to the exponential transitions are calculated by $$\mu_1 = \mu_d \mp \frac{\sqrt{\gamma(\gamma+1)\sigma^2 - \gamma\mu^2}}{\gamma+1} \qquad \text{(Eq. 7)}$$

$$\mu_2 = \Upsilon\mu_d \mp \frac{\sqrt{\gamma(\gamma+1)\sigma^2 - \gamma\mu^2}}{\gamma+1} \qquad \text{(Eq. 8)}$$

Alternatively, the model can also use the embedded Markov chain to represent the states and transitions of the queueing system with the hypoexponential service time where k denotes the number of requests in the system and n denotes the number of the stage processing some request. The steady state probability at the state (k,n) is given by $p_{k,n}$.

Then the generalization case would lead to solving the transition states to deduce the following:

The mean number of requests in the system is $$\overline{K} = \Sigma_{i-1}^{K}\Sigma_{j=1}^{N} i p_{i,j} \qquad \text{(Eq. 9)}$$

The mean time spent by a request in the system if it was not rejected at the entrance to the queue because of the buffer overflow is expressed as $$W = \frac{\overline{K}}{r} = \frac{1}{\lambda} \cdot \frac{\sum_{i=1}^{K}\sum_{j=1}^{N} i p_{i,j}}{1 - \sum_{j=1}^{N} pK_j} \qquad \text{(Eq. 10)}$$

For the numerical solution of the transient behavior of the adopted model, the Runge-Kutta method with adaptive step-size control may be used. In adaptive step-size control, the algorithm observes its progress at each step and adjusts the step-size according to the accuracy required. It increases the step-size as far as the predetermined accuracy allows and completes the integration with a fewer number of steps than it would without any increase in step-size. This adaptive step-size control feature results in faster integration for the required integration duration.

In the model, transition rates determine the transient behavior of the system. As the ratios between these rates change drastically, the transient status of the system alters faster.

Note that this activity affects the Kolmogorov equations by decreasing the iteration interval (t+Δt) or, in other words, increases the rate of change in the system. Therefore, it diminishes the potential gain in run-time through the adaptive step-size control of the method.

Hence, when the logarithmic proportion of transition rates exceeds a certain value, the number of steps increases drastically. Since the number of steps is one of the main factors determining the run-time, it may be concluded that there exists a similar relationship between logarithmic proportions of transition rates and run-time.

By way of specific example, assume there are six jobs, J1 through J6 each having a respective required number of instances (VMs) and units of service time. Table 1 below illustrates these parameters for all six jobs:

TABLE 1

| Job | # Instances | Service | Wait | End |
|---|---|---|---|---|
| J1 | 1 | 20 | 0 | 9 |
| J2 | 2 | 5 | 0 | 4 |
| J3 | 4 | 10 | 0 | 8 |
| J4 | 6 | 5 | 10 | 13 |
| J5 | 3 | 15 | 0 | 11 |
| J6 | 1 | 10 | 0 | 7 |
| Avg. | | | 1.66 | 8.66 |

J1 requires 1 instance (VM) for 20 units of time; J2 requires 2 instances for 5 units of time (each); J3 requires 4 instances for 10 units of time; J4 requires 6 instances for 5 units of time; J5 requires 3 instances for 15 units of time; and J6 requires 1 instance for 10 units of time. 'Wait' responds to the job until the job start and 'End' shows the last time instance when the job is finished.

Assume that job assignments are made in a first-come, first-served (FCFS) fashion. For example, the jobs are provisioned using a FCFS policy that proceeds as follows:
(i) Holds the incoming job in a queue;
(ii) Retrieves the job at the head of the queue;
(iii) Allocates the available node(s) to execute the job (otherwise wait and re-retrieve the next job, and repeat the allocation attempt);
(iv) If there are nodes available as required by this job at the head of queue then allocate the nodes to this job and perform a cleanup function and relieve/dealloc cycle, otherwise
(v) If there are not nodes available as required by this job, define the criticality of the job and if critical, create a new instance to execute this job and then perform a cleanup function and relieve/dealloc cycle, otherwise hold in the queue and return to (iv).

Using this scheduling policy in conjunction with the example six jobs indicated in Table 1, the following table (Table 2) presents a time-sequenced breakdown of job execution on six nodes P1-P6 (e.g. VMs in this example), since that is the greatest number of instances needed for any of the six jobs J1-J6.

TABLE 2

| Time | P1 | P2 | P3 | P4 | P5 | P6 |
|---|---|---|---|---|---|---|
| 0 | J1 | J2 | J2 | | | |
| 1 | J1 | J2 | J2 | | | |
| 2 | J1 | J2 | J2 | | | |
| 3 | J1 | J2 | J2 | | | |
| 4 | J1 | J2 | J2 | | | |
| 5 | J1 | | | | | |
| 6 | J1 | | | | | |
| 7 | J1 | | | | | |
| 8 | J1 | | | | | |
| 9 | J1 | | | | | |
| 10 | J1 | | | | | |
| 11 | J1 | | | | | |
| 12 | J1 | | | | | |
| 13 | J1 | | | | | |
| 14 | J1 | | | | | |
| 15 | J1 | | | | | |
| 16 | J1 | | | | | |
| 17 | J1 | | | | | |
| 18 | J1 | | | | | |
| 19 | J1 | | | | | |

TABLE 2-continued

| Time | P1 | P2 | P3 | P4 | P5 | P6 |
|---|---|---|---|---|---|---|
| 20 | J3 | J3 | J3 | J3 | | |
| 21 | J3 | J3 | J3 | J3 | | |
| 22 | J3 | J3 | J3 | J3 | | |
| 23 | J3 | J3 | J3 | J3 | | |
| 24 | J3 | J3 | J3 | J3 | | |
| 25 | J3 | J3 | J3 | J3 | | |
| 26 | J3 | J3 | J3 | J3 | | |
| 27 | J3 | J3 | J3 | J3 | | |
| 28 | J3 | J3 | J3 | J3 | | |
| 29 | J3 | J3 | J3 | J3 | | |
| 30 | J4 | J4 | J4 | J4 | J4 | J4 |
| 31 | J4 | J4 | J4 | J4 | J4 | J4 |
| 32 | J4 | J4 | J4 | J4 | J4 | J4 |
| 33 | J4 | J4 | J4 | J4 | J4 | J4 |
| 34 | J4 | J4 | J4 | J4 | J4 | J4 |
| 35 | J5 | J5 | J5 | J6 | | |
| 36 | J5 | J5 | J5 | J6 | | |
| 37 | J5 | J5 | J5 | J6 | | |
| 38 | J5 | J5 | J5 | J6 | | |
| 39 | J5 | J5 | J5 | J6 | | |
| 40 | J5 | J5 | J5 | J6 | | |
| 41 | J5 | J5 | J5 | J6 | | |
| 42 | J5 | J5 | J5 | J6 | | |
| 43 | J5 | J5 | J5 | J6 | | |
| 44 | J5 | J5 | J5 | J6 | | |
| 45 | J5 | J5 | J5 | | | |
| 46 | J5 | J5 | J5 | | | |
| 47 | J5 | J5 | J5 | | | |
| 48 | J5 | J5 | J5 | | | |
| 49 | J5 | J5 | J5 | | | |

With the conventional FCFS policy exemplified above, performance is relatively poor with over provisioning leading to an average of 50% utilization. Between times 5 and 19, only one node is utilized and five are idle. Some nodes had as low as 15% utilization, the average across the nodes was 49%.

In an alternative scheduling approach as described herein, solving with a two-tier architecture of VM processing (foreground and background) for tightly coupled jobs yields the following job-node allocation over a time period:

| Job | # Instances | Service | Wait | End |
|---|---|---|---|---|
| J1 | 1 | 20 | 0 | 9 |
| J2 | 2 | 5 | 0 | 4 |
| J3 | 4 | 10 | 0 | 8 |
| J4 | 6 | 5 | 10 | 13 |
| J5 | 3 | 15 | 0 | 11 |
| J6 | 1 | 10 | 0 | 7 |
| Avg. | | | 1.66 | 8.66 |

In this example, the # instances and service time is of course the same however the wait and end times differ drastically from the conventional approach above.

The following table (Table 3) presents a time-sequenced breakdown of job execution on six nodes P1-P6 (e.g. VMs in this example) with a two-tier (foreground and background processing) architecture.

TABLE 3

| Time | P1-FG | P2-FG | P3-FG | P4-FG | P5-FG | P6-FG | P1-BG | P2-BG | P3-BG | P4-BG | P5-BG | P6-BG |
|---|---|---|---|---|---|---|---|---|---|---|---|---|
| 0 | J1 | J2 | J2 | J3 | J3 | J3 | J1 | J3 | J5 | J5 | J5 | J6 |
| 1 | J1 | J2 | J2 | J3 | J3 | J3 | J1 | J3 | J5 | J5 | J5 | J6 |
| 2 | J1 | J2 | J2 | J3 | J3 | J3 | J1 | J3 | J5 | J5 | J5 | J6 |
| 3 | J1 | J2 | J2 | J3 | J3 | J3 | J1 | J3 | J5 | J5 | J5 | J6 |
| 4 | J1 | J2 | J2 | J3 | J3 | J3 | J1 | J3 | J5 | J5 | J5 | J6 |
| 5 | J1 | J3 | J3 | J3 | J3 | J6 | J1 | J3 | J5 | J5 | J5 | J6 |
| 6 | J1 | J3 | J3 | J3 | J3 | J6 | J1 | J3 | J5 | J5 | J5 | J6 |
| 7 | J1 | J3 | J3 | J3 | J3 | J6 | J1 | J3 | J5 | J5 | J5 |   |
| 8 | J1 | J3 | J3 | J3 | J3 | J5 | J1 | J3 |   | J5 | J5 | J5 |
| 9 | J1 |   |   | J5 | J5 | J5 | J1 |   |   | J5 | J5 | J5 |
| 10 |   |   |   | J5 | J5 | J5 |   |   |   | J5 | J5 | J5 |
| 11 | J4 | J4 | J4 | J4 | J4 | J4 | J5 | J5 | J5 |   |   |   |
| 12 | J4 | J4 | J4 | J4 | J4 | J4 | J4 | J4 | J4 | J4 | J4 | J4 |
| 13 | J4 | J4 | J4 | J4 | J4 | J4 | J4 | J4 | J4 | J4 | J4 | J4 |
|   | 93% | 86% | 86% | 100% | 100% | 100% | 93% | 86% | 79% | 93% | 93% | 86% |

In the situation summarized in Table 2, P1, P2, etc. are nodes (e.g. VMs) and J1, J2, etc. are the jobs being processed.

A job, for instance J1, being processed by foreground and background processing of a common node (e.g. P1 as in the case at time 0) may be processed as threads, i.e. by using multithreading with both thread running in parallel.

Using J1 as an example, the requirement for J1 is one instance for 20 units of time. In the first 10 units of time processing under the approach herein, foreground processing of the node takes the computationally intensive tasks of J1 while background processing of the node takes the data intensive tasks of J1, for a total of 20 units of time. By way of basic example, assuming that after time 1, the computationally intensive tasks require date for computation. Instead of waiting on that data, in accordance with aspects described herein, J1 in background processing will be obtaining (fetching, retrieving, etc.) that data during times 0/1 in order that it is ready at the beginning of time 2 for J1 in foreground processing. There may be times when the foreground or background processing is waiting for the other to produce some data, but typically there will be tasks in a job that can be performed in parallel.

It is noted that the time schedule in the above represents the time that real-time processing spends processing the tasks of the jobs noted; in practice the node may be pausing the tasks occasionally to switch to other processing.

It is seen that node utilization ranges from a minimum of 79% to a maximum of 100% across nodes P1 through P6, and total processing time is 14 units of time. Moreover, processing of all jobs except J4 begins at time 0, while job J4 begins at time 11 and completes in three units of time. The result is a significant improvement over the conventional approach.

Figure 6:
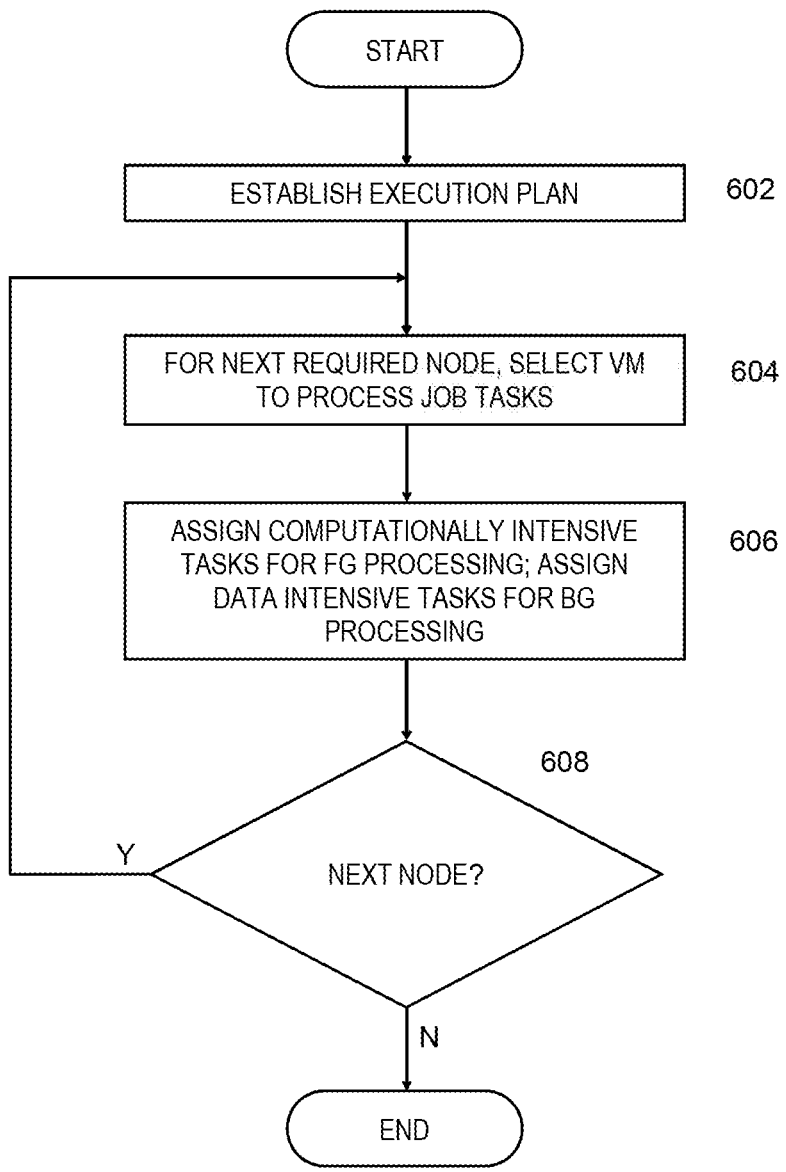
FIG. 6 depicts an example process for managing execution of a job in a computing environment, in accordance with aspects described herein.

FIG. 6 depicts an example process for managing execution of a job in a computing environment, in accordance with aspects described herein. In some examples, the process is performed by one or more computer systems, such as those described herein, which may include one or more job scheduling computer systems of or connected to a cloud computing environment, one or more cloud servers, and/or one of more other computer systems.

The process begins by establishing, for a job of potentially a plurality of jobs to be executed in a computing environment, an execution plan for processing the job (602). The execution plan can identify computationally intensive tasks of the job and data intensive tasks of the job. The process proceeds by entering a loop in which, for a next required node for the job (i.e. multiple instances may be require for job processing), it selects a virtual machine, of a plurality of virtual machines of the computing environment, to process the identified computationally intensive tasks of the job and identified data intensive tasks of the job (604). The process then assigns the identified computationally intensive tasks of the job for foreground processing of the selected virtual machine and assigns the identified data intensive tasks of the job for background processing of the selected virtual machine (606). In one embodiment, this assignment also includes dispatching the job to the particular virtual machine. Execution of the job can thus execute the assigned identified computationally intensive tasks of the job in foreground processing of the virtual machine and execute the assigned identified data intensive tasks of the job in background processing of the virtual machine. The foreground processing of the virtual machine can include processing of one or more processes executing in a foreground of the virtual machine, and background processing of the virtual machine can include processing of one or more processes executing in a background of the virtual machine. In some examples, the foreground processing of the virtual machine and the background processing of the virtual machine include processing in parallel to each other, for instance by multithreading the foreground processing and background processing on multiple threads running in parallel.

The process can repeat this selection and assignment for each of the instances needed to process the job. Execution of the job can include execution on multiple virtual machines of the computing environment. In this case, the identified computationally intensive tasks of the job can include a first set of computationally intensive tasks of a plurality of sets of computationally intensive tasks, of the job, identified in the execution plan, and the identified data intensive tasks of the job can include a first set of data intensive tasks of a plurality of set of data intensive tasks, of the job, identified in the execution plan.

Consequently, referring to FIG. 6, the process determines whether there is a next node to which tasks of the job are to be assigned (608). If so, (608, Y), the process returns to 604, otherwise the process ends.

Thus, based on the iterating that may occur in the process of FIG. 6, for each set of the plurality of sets of computationally intensive tasks of the job, the process (i) selects a respective virtual machine, of the plurality of virtual machines of the computing environment, to process the set of computationally intensive tasks of the job and to process a corresponding set of data intensive tasks, of the plurality of set of data intensive tasks, of the job, and (ii) assigns the set of computationally intensive tasks for foreground processing of the respective virtual machine and assigns the corresponding data intensive tasks for background processing of the respective virtual machine.

It is noted that various data intensive tasks might relate or correspond as dependencies to particular computationally intensive tasks, in which case the tasks can be assigned to a common node as above. The execution plan can identify, for each set of the plurality of sets of computationally intensive tasks of the job, dependencies of the computationally intensive tasks in the set, the dependencies being a corresponding set of data intensive tasks, and the assigning can keep the computationally intensive tasks and its dependencies on a same virtual machine of the multiple virtual machines.

In addition, there may be multiple jobs to be scheduled and processed. One or more execution plans can identify computationally intensive tasks of each job and data intensive tasks of each job, and the process of FIG. 6 can be performed for managing execution of all such jobs.

Although various examples are provided, variations are possible without departing from a spirit of the claimed aspects.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    establishing, for a job of a plurality of jobs to be executed in a computing environment, an execution plan for processing the job, the execution plan identifying computationally intensive tasks of the job and data intensive tasks of the job;
    selecting a virtual machine, of a plurality of virtual machines of the computing environment, to process the identified computationally intensive tasks of the job and identified data intensive tasks of the job; and
    assigning the identified computationally intensive tasks of the job for foreground processing of the virtual machine and assigning the identified data intensive tasks of the job for background processing of the virtual machine, wherein execution of the job executes the identified computationally intensive tasks of the job in foreground processing of the virtual machine and executes the identified data intensive tasks of the job in background processing of the virtual machine, wherein the execution plan further identifies, for each set of a plurality of sets of computationally intensive tasks of the job, dependencies of the computationally intensive tasks in the set, the dependencies being a respective set of data intensive tasks, of a plurality of sets of data intensive tasks of the job, corresponding to the set of computationally intensive tasks, and wherein the assigning keeps the identified computationally intensive tasks and its dependencies on a same virtual machine of multiple virtual machines.

2. The method of claim 1, wherein the foreground processing of the virtual machine comprises processing of one or more processes executing in a foreground of the virtual machine, and background processing of the virtual machine comprises processing of one or more processes executing in a background of the virtual machine.

3. The method of claim 1, wherein the foreground processing of the virtual machine and the background processing of the virtual machine comprises processing in parallel to each other.

4. The method of claim 3, wherein the processing in parallel comprises multithreading the foreground processing and background processing.

5. The method of claim 1, wherein execution of the job comprises execution on multiple virtual machines of the computing environment, wherein the identified computationally intensive tasks of the job comprise a first set of computationally intensive tasks of the plurality of sets of computationally intensive tasks, of the job, identified in the execution plan, and wherein the identified data intensive tasks of the job comprise a first set of data intensive tasks of the plurality of set of data intensive tasks, of the job, identified in the execution plan.

6. The method of claim 5, further comprising, for each set of the plurality of sets of computationally intensive tasks of the job:
    selecting a respective virtual machine, of the plurality of virtual machines of the computing environment, to process the set of computationally intensive tasks of the job and to process the corresponding set of data intensive tasks, of the plurality of sets of data intensive tasks, of the job; and assigning the set of computationally intensive tasks for foreground processing of the respective virtual machine and assigning the corresponding set of data intensive tasks for background processing of the respective virtual machine.

7. A computer system comprising:
a memory; and
a processor in communication with the memory, wherein the computer system is configured to perform a method comprising:
establishing, for a job of a plurality of jobs to be executed in a computing environment, an execution plan for processing the job, the execution plan identifying computationally intensive tasks of the job and data intensive tasks of the job;
selecting a virtual machine, of a plurality of virtual machines of the computing environment, to process the identified computationally intensive tasks of the job and identified data intensive tasks of the job; and
assigning the identified computationally intensive tasks of the job for foreground processing of the virtual machine and assigning the identified data intensive tasks of the job for background processing of the virtual machine, wherein execution of the job executes the identified computationally intensive tasks of the job in foreground processing of the virtual machine and executes the identified data intensive tasks of the job in background processing of the virtual machine, wherein the execution plan further identifies, for each set of a plurality of sets of computationally intensive tasks of the job, dependencies of the computationally intensive tasks in the set, the dependencies being a respective set of data intensive tasks, of a plurality of sets of data intensive tasks of the job, corresponding to the set of computationally intensive tasks, and wherein the assigning keeps the identified computationally intensive tasks and its dependencies on a same virtual machine of multiple virtual machines.

8. The computer system of claim 7, wherein the foreground processing of the virtual machine comprises processing of one or more processes executing in a foreground of the virtual machine, and background processing of the virtual machine comprises processing of one or more processes executing in a background of the virtual machine.

9. The computer system of claim 7, wherein the foreground processing of the virtual machine and the background processing of the virtual machine comprises processing in parallel to each other.

10. The computer system of claim 9, wherein the processing in parallel comprises multithreading the foreground processing and background processing.

11. The computer system of claim 7, wherein execution of the job comprises execution on multiple virtual machines of the computing environment, wherein the identified computationally intensive tasks of the job comprise a first set of computationally intensive tasks of the plurality of sets of computationally intensive tasks, of the job, identified in the execution plan, and wherein the identified data intensive tasks of the job comprise a first set of data intensive tasks of the plurality of set of data intensive tasks, of the job, identified in the execution plan.

12. The computer system of claim 11, wherein the method further comprises, for each set of the plurality of sets of computationally intensive tasks of the job:
selecting a respective virtual machine, of the plurality of virtual machines of the computing environment, to process the set of computationally intensive tasks of the job and to process the corresponding set of data intensive tasks, of the plurality of sets of data intensive tasks, of the job; and
assigning the set of computationally intensive tasks for foreground processing of the respective virtual machine and assigning the corresponding set of data intensive tasks for background processing of the respective virtual machine.

13. A computer program product comprising:
a computer readable storage medium readable by a processor and storing instructions for execution by the processor for performing a method comprising:
establishing, for a job of a plurality of jobs to be executed in a computing environment, an execution plan for processing the job, the execution plan identifying computationally intensive tasks of the job and data intensive tasks of the job;
selecting a virtual machine, of a plurality of virtual machines of the computing environment, to process the identified computationally intensive tasks of the job and identified data intensive tasks of the job; and
assigning the identified computationally intensive tasks of the job for foreground processing of the virtual machine and assigning the identified data intensive tasks of the job for background processing of the virtual machine, wherein execution of the job executes the identified computationally intensive tasks of the job in foreground processing of the virtual machine and executes the identified data intensive tasks of the job in background processing of the virtual machine, wherein the execution plan further identifies, for each set of a plurality of sets of computationally intensive tasks of the job, dependencies of the computationally intensive tasks in the set, the dependencies being a respective set of data intensive tasks, of a plurality of sets of data intensive tasks of the job, corresponding to the set of computationally intensive tasks, and wherein the assigning keeps the identified computationally intensive tasks and its dependencies on a same virtual machine of multiple virtual machines.

14. The computer program product of claim 13, wherein the foreground processing of the virtual machine comprises processing of one or more processes executing in a foreground of the virtual machine, and background processing of the virtual machine comprises processing of one or more processes executing in a background of the virtual machine.

15. The computer program product of claim 13, wherein the foreground processing of the virtual machine and the background processing of the virtual machine comprises processing in parallel to each other.

16. The computer program product of claim 13, wherein execution of the job comprises execution on multiple virtual machines of the computing environment, wherein the identified computationally intensive tasks of the job comprise a first set of computationally intensive tasks of the plurality of sets of computationally intensive tasks, of the job, identified in the execution plan, and wherein the identified data intensive tasks of the job comprise a first set of data intensive tasks of the plurality of set of data intensive tasks, of the job, identified in the execution plan.

17. The computer program product of claim 16, wherein the method further comprises, for each set of the plurality of sets of computationally intensive tasks of the job:

selecting a respective virtual machine, of the plurality of virtual machines of the computing environment, to process the set of computationally intensive tasks of the job and to process the corresponding set of data intensive tasks, of the plurality of sets of of data intensive tasks, of the job; and assigning the set of computationally intensive tasks for foreground processing of the respective virtual machine and assigning the corresponding set of data intensive tasks for background processing of the respective virtual machine.

\* \* \* \* \*